United States Patent [19]

Green et al.

[11] Patent Number: 4,641,405

[45] Date of Patent: Feb. 10, 1987

[54] SERVO SYSTEM METHOD AND APPARATUS SERVO VALVE APPARATUS THEREFOR AND METHOD OF MAKING SAME

[75] Inventors: C. Brad Green, Mesa; William Dobson, Scottsdale; Stephen G. Abel, Mesa, all of Ariz.

[73] Assignee: The Garrett Corporation, Los Angeles, Calif.

[21] Appl. No.: 641,113

[22] Filed: Aug. 15, 1984

[51] Int. Cl.$^4$ .................. B21D 53/00; B23P 15/00
[52] U.S. Cl. ................................ 29/157.1 R; 29/444; 29/512; 137/85; 137/512; 137/614.01; 137/630.13; 251/356
[58] Field of Search ................. 29/157.1 R, 434, 437, 29/444, 505, 509, 512; 137/84, 85, 86, 512, 512.2, 614.01, 614.16, 614.17, 614.18, 630, 630.13, 596.17, 627.5; 251/325, 359, 364, 365, 356

[56] References Cited

U.S. PATENT DOCUMENTS

| | | | |
|---|---|---|---|
| 2,634,752 | 4/1953 | Bertea | 137/84 |
| 3,334,397 | 8/1967 | Lewakowski | 29/157.1 R |
| 3,913,421 | 10/1975 | Hawkins | 29/512 X |
| 4,084,304 | 4/1978 | Meyers | 29/157.1 R |
| 4,106,750 | 8/1978 | Karden et al. | 137/614.16 X |
| 4,151,856 | 5/1979 | Burrus | 137/630.13 |
| 4,337,798 | 7/1982 | Zettergren | 137/627.5 |
| 4,447,944 | 5/1984 | Mohrman | 29/512 |

OTHER PUBLICATIONS

Mandel, Siegfried; Dictionary of Science (Sixth Printing); Dell Publishing Company, New York, NY. (1977), at 349 (Definition of "Valve").

*Primary Examiner*—Howard N. Goldberg
*Assistant Examiner*—Ronald S. Wallace
*Attorney, Agent, or Firm*—Terry L. Miller; Albert J. Miller

[57] ABSTRACT

Pressure fluid operated servo system method and apparatus including a servo valve operable by an input signal to effect a system output movement; and which servo valve is responsive to the time rate of input signal receipt to vary a gain ratio of system output magnitude compared to input signal value; and method of making such a servo valve.

14 Claims, 12 Drawing Figures

SERVO SYSTEM METHOD AND APPARATUS SERVO VALVE APPARATUS THEREFOR AND METHOD OF MAKING SAME

CROSS REFERENCE TO RELATED APPLICATION

The present application sets forth subject matter in common with application Ser. No. 641,104, entitled "Servo System Method And Apparatus, Servo Valve Apparatus Therefor And Method Of Making Same", filed on Aug. 15, 1984, and assigned to the same assignee as the present application.

BACKGROUND OF THE INVENTION

The field of the present invention is servo apparatus and methods. More particularly, the present invention relates to servo apparatus and methods of the type used to control or direct the course of a dirigible projectile or automotive vehicle, such as a torpedo or airborne missile. In such an application the servo apparatus is generally known as a fin actuator or control surface actuator, and is employed to move and selectively position a fin, rudder, or other movable control portion of the vehicle to effect the course of movement thereof in response to a control signal.

With still greater particularity, the present invention relates to novel valve apparatus having particular utility in servo apparatus of the above-described character. The inventive valve apparatus herein set forth may be employed to control a flow of pressurized compressible or incompressible fluid from a source to a first receiver and from the first receiver to a lower pressure second receiver in response to respective input signals or commands.

When employed in a servo system of the above described character, the first receiver is a fluid pressure responsive motor driving the vehicle control portion, while the second receiver is a low pressure sump or vent to ambient pressure. The valve apparatus is operatively associated with, or integrally formed with, a transducing device which drives a portion of the valve apparatus between selected operative positions in response to input signals. By way of example, the input signals may be electrical voltage or current signals originating with a vehicle autopilot. In such a case, the transducing device may take the form of a solenoid coil, or of a Galvenometer movement coupled to the valve apparatus via force amplifying structure.

A conventional servo valve is known in accordance with U.S. Pat. No. 4,151,856 granted May 1, 1979 to B. S. Burrus, wherein an input member provides an input signal by moving an input portion of the servo valve to a selected position. The input portion of the servo valve cooperates with a plug member and a movable wall to define a two-way pilot valve. Communication of pressure fluid is controlled by the pilot valve to and from a force amplifying diaphram actuating a second or booster two-way valve.

With a servo valve according to the invention of Burrus, it is believed the input signal must overcome substantially unbalanced forces originating both with fluid pressures and with resilient members within the valve before the pilot valve is moved from a closed to an open position to effect an increase or decrease of output pressure. Consequently, the servo valve of Burrus is believed to have an inherent force dead band wherein forces exerted by the input member do not effect an output pressure change. The input member forces must, it is believed, exceed the force dead band and effect a movement of the input member before an output pressure change can be effected.

Further, with respect to the servo valve of Burrus, the gain of the valve, that is, the ratio of output pressure change to input signal change, is believed to be substantially constant regardless of the rate or frequency of input signal changes applied to the servo valve. Such a substantially constant servo valve gain within a broad frequency band width may present no serious or unacceptable detriment in a relatively low fidelity servo system. In such a servo system, the output response of the system may permissively deviate from that commanded by the input signal, particularly during transient response of the system.

On the other hand, because a narrow band width servo system of relatively high fidelity needs respond to input signals only within a relatively narrow range of frequency, the servo system can be designed to be stable and provide a response of high fidelity within the permissible frequency band for the input signal, even with a servo valve like that of Burrus. However, when a conventional servo valve, like that of Burrus, is employed in a servo system required to provide high fidelity over a broad frequency band width, or rate of input signal change, many deficiencies become apparent.

By way of example only, the mission requirements of a very high-speed dirigible automotive vehicle, such as an air-to-air missile, well illustrate a very challenging problem to a servo system. On one hand, missile launching and terminal phases of the mission require large, high-powered, frequent excursions of the missile aerodynamic control surfaces. These large excursions will be made in response to correlative input signals, and must be well damped and executed with stability and without overshoot. Such large excursions of the control surfaces are necessary to achieve launching of the missile while avoiding collision with the parent aircraft, and to successfully follow an evasive target.

On the other hand, cruising phases of the missile mission require only comparatively small and infrequent control surface movements for course correction. However, these small course-corrective movements must in fact be made by the servo system in response to small input signals. That is, if the small input signals are lost to servo system dead band or hysterisis, a course correction will be effected only after the course error has reached a higher level. The missile will then undesirably follow a wandering course.

In view of the above, it will be appreciated that each phase of operation of a high-speed dirigible automotive vehicle, of whatever type, requires differing characteristics of the control servo system. Launch and terminal mission phases require a low-gain, high powered servo system which is stable at high frequencies. Missile cruise, on the other hand, requires a high-gain, sensitive and responsive servo system which will effect small input signals.

However, it is believed conventional servo apparatus cannot satisfactorily fulfill the full range of requirements set out above. As pointed out above, conventional servo valves generally have a substantially flat gain curve as a function of input frequency. However, the control surface movement requirements outlined above, and other servo system applications, require a relatively high system gain at low frequencies and a lessening gain as a function of input signal frequency. This requirement is not necessarily within the scope of conventional servo apparatus and servo valves.

SUMMARY OF THE INVENTION

In view of the above-outlined deficiencies of conventional servo valve apparatus, it is an object for the present invention to provide servo valve method and apparatus wherein imbalanced pressure forces within the valve apparatus are substantially eliminated within a selected input signal frequency band width.

In further view of the above, it is an object for the present invention to provide a servo valve method and apparatus where the input force dead band of the valve apparatus is substantially eliminated within the selected input frequency band width.

A concomitant objective for the present invention in view of the above is to provide a servo valve method and apparatus having an increased gain of output fluid pressure as a function of input signal magnitude within the selected band width of input frequency.

Still further, the present invention according to an object thereof is to provide a servo valve apparatus displaying a gain decreasing with input frequency above the selected input frequency band width to reach a lesser substantially constant gain at a determined input frequency and thereabove.

Yet another object of the present invention is to provide servo system method and apparatus including the above-described servo valve methods and apparatus.

Still another object of the present invention is to provide method of making servo valve apparatus according to the invention.

Method of operating a servo system having a gain variable in response to input signal frequency is also an object of the present invention.

Accordingly, the present invention provides servo valve apparatus and method wherein an input member is selectively movable by an input force transducer to move a first and a second valve elements respectively controlling the supply and venting of pressure fluid from a source to and from a receiver. Force balancing structure is provided for substantially counter balancing pressure forces within the valve apparatus to effect high gain operation thereof substantially without an input force dead band. The force balancing structure includes means for selectively inhibiting the operation thereof with increasing input signal frequency.

More particularly, the present invention comprehends servo valve apparatus of the two-way, closed-center type wherein an input member is movable to selectively communicate pressure fluid from an inlet to an outlet, or from the outlet to a vent, in response to respective input signals. The input member is subject to fluid pressure at the outlet to substantially pressure balance the valve apparatus. The communication of the input member with output fluid pressure is inhibited so that with rapid changes in output pressure the valve apparatus is not fully pressure balanced and exhibits a lessened gain and increased force dead band.

With still greater particularity, the present invention comprehends a servo valve apparatus comprising a housing defining inlet, outlet, and vent ports with a flow path communicating all of the ports with one another. A first valve member is movably received in the flow path and cooperates with the housing in a first position to close fluid communication from the inlet port to the outlet port. The first valve member defines a passage communicating the outlet port with the vent. A second valve member is movably received in the flow path and cooperates with the first valve member in a first relative position thereof to close communication between the outlet port and the vent. The second valve member is movable subject to an input signal to move in the first relative position while moving the first valve member to a second position communicating the inlet port with the outlet port. The second valve member is also movable subject to an input signal to move from the first relative position to a second relative position communicating the outlet port with the vent. The valve apparatus defines a feedback area which is subject to fluid pressure within a feedback fluid volume. The feedback fluid volume is restrictively communicated with the outlet port. Consequently, the fluid pressure within the feedback fluid volume follows fluid pressure at the outlet port approximately as a first time derivative thereof. Force is transmitted from the feedback area to the second valve member to counterbalance pressure forces on both the first and second valve members. As a result, when the fluid pressure at the outlet port is changing slowly and the pressure of the feedback fluid volume approximates outlet port pressure, the valve apparatus is substantially pressure balanced, has substantially no force dead band, and displays a comparatively high gain. On the other hand, with rapid change of fluid pressure at the outlet port the pressure of the feedback fluid volume lags so that pressure balancing and gain of the valve apparatus are lessened.

The present invention also comprehends a servo system wherein an output member is selectively movable by a fluid pressure responsive motor in response to a flow of pressure fluid from a source thereof via a servo valve subject to input signals. The servo valve includes means providing a variable negative feedback of force opposing the input signals. The feedback force is analogous to a first time derivative of fluid pressure supplied by the servo valve to the motor. Consequently, the servo system exhibits a gain of output member movement compared to input signal magnitude which is variable and lessens with increasing frequency of input signal changes. Moreover, because acceleration of the output member is a function of the force applied thereto by the fluid pressure responsive motor, and is proportional to the rate of change in fluid pressure supplied thereto by the servo valve, the feedback effective within the servo valve represents a negative feedback within the servo system which is analogous to the second time derivative, or acceleration, of the output member. Such feedback is advantageous in achieving a stable high fidelity servo system.

Further, the present invention comprehends a method of operating a servo system wherein an output member is movable in response to an input signal comprising the steps of providing a pressure fluid source, coupling a fluid pressure responsive motor to the output member to move the latter, communicating the pressure fluid source to the motor via servo valve responsive to the input signal, applying an input signal to the servo valve to effect movement of the output member, and providing a negative feedback to the control valve resisting the input signal, the negative feedback being a function of fluid pressure supplied to the motor, and analogous to a function of acceleration of the output member.

Also provided by the present invention is a method of operating a servo valve including flowing pressure fluid through the servo valve past a valve member movable to interrupt the fluid flow, applying an input to the valve member to selectively permit and interrupt the fluid flow, and applying a negative feedback force to the valve member in opposition to the input as a function of the fluid pressure downstream of the valve member.

The present invention also provides novel method of making servo valve apparatus of the two-way, closed-center type having a pair of valve members each defining a respective sealing area and being, therefore, pressure responsive to pressure fluid applied thereto. The novel method of the present invention according to one aspect thereof comprises operatively associating a first elongate valve member with an annular seat member therefore to define one sealing area, the first valve member being cooperable with a second valve member to define the other of the pair of sealing areas, and plastically deforming the first valve member to both match the other sealing area with the one sealing area and to captively retain the seat member on the first valve member.

In view of the above, it will be seen that a number of advantages are offered by the present invention. For example, a servo valve according to the invention may utilize a lower powered input force transducer because the valve apparatus is substantially pressure balanced at relatively low input frequencies. Further, the valve apparatus according to the present invention, while displaying a relatively high gain at low input frequencies, has a diminishing gain with increasing input frequency so that the stability of a servo system including the servo valve is enhanced at higher operating frequencies of input signal. Still further, a servo system according to the invention has a high gain at low input frequencies so that infrequent input signals of low magnitude are not swamped out or lost to servo system inertia, dead band, or hysterisis, and are in fact effected by the servo system. Additionally, the preceding servo system includes, via the servo valve hereof, a negative feedback loop analogous to acceleration of the output member so that stability of the servo system at high input frequencies is enhanced, and overshoot is avoided.

DETAILED DESCRIPTION OF THE PREFERRED EMBODIMENTS

By way of example only, the present invention is herein depicted and described with reference to several preferred embodiments therof which, as depicted, take the form of a positioner servo system for an aerodynamic control surface of an airborne vehicle, such as an automotive missile. The particular context and environment within which the present invention is described is not, and should not be construed as being, a limitation upon the invention.

Figure 1:
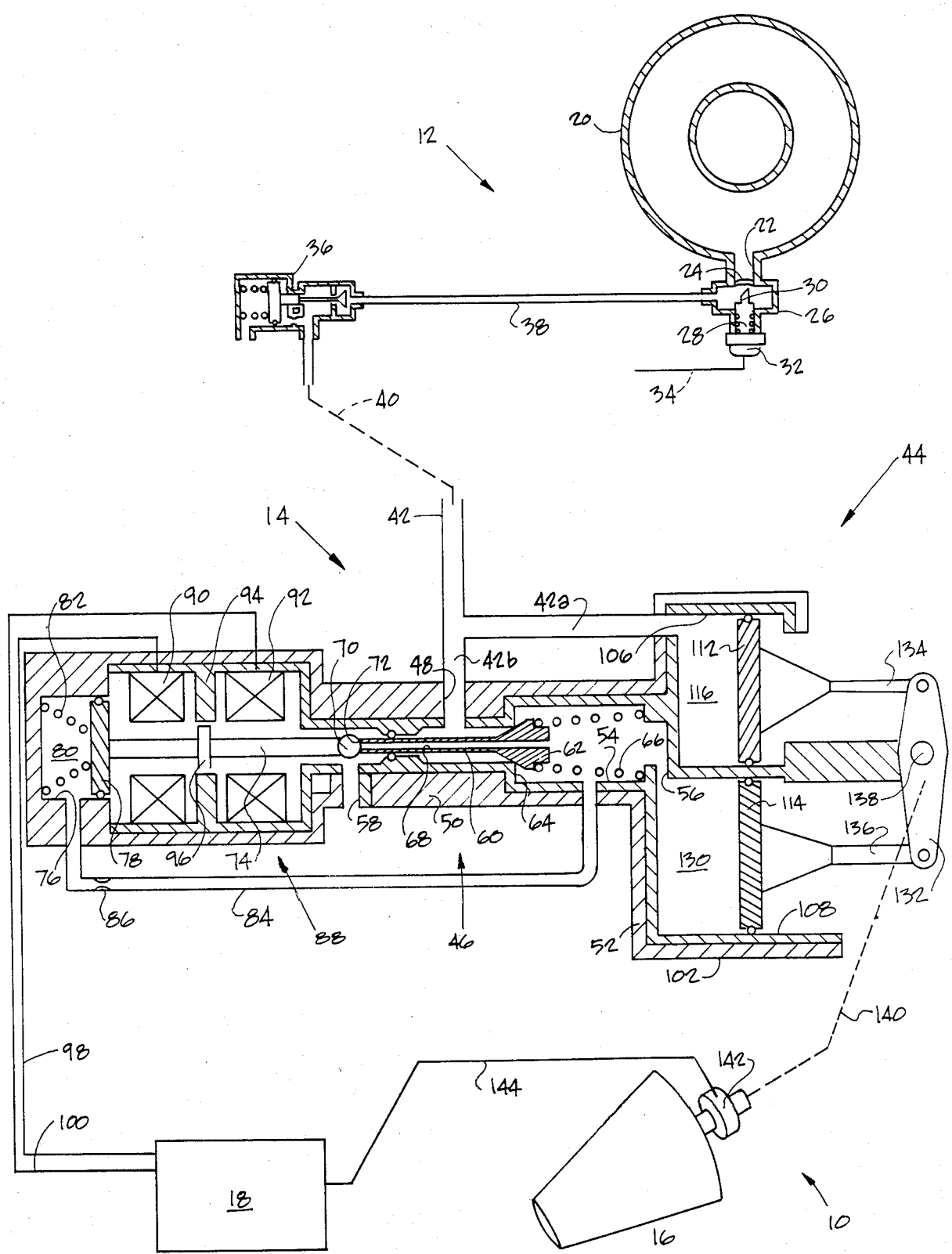
FIG. 1 schematically depicts a servo system according to the invention with several of the components thereof shown partially in cross section for clarity of illustration.

FIG. 1 schematically depicts a preferred embodiment of the present inventive servo system apparatus 10. The apparatus 10 is depicted as a missile fin actuator. In overview, the servo system apparatus 10 includes a fluid pressure source, generally referenced with the numeral 12; a combined control signal transducer, servo valve apparatus, and fluid pressure motor unit 14; a vehicle control portion 16, which is pivotally driven by the motor portion of unit 14 and takes the form of an aerodynamic missile fin; and a control signal originator 18.

With greater particularity, the fluid pressure source 12 conventionally includes a toroidal pressure vessel 20 which holds pressurized gaseous fluid. By way of example, the vessel 20 preferably contains gaseous Helium at a storage pressure of from about 8000 PSIG to as much as 12,000 PSIG. The vessel 20 defines an outlet port 22 wherein is disposed a frangible closure diaphram 24. An electroinitiator 26 is secured to the pressure vessel at port 22. The electroinitiator includes a movable plunger 28 which carries a diaphram penetrator portion 30. The plunger 28 is movable to pierce diaphram 24 with penetrator 30 upon detonation of a small explosive charge which is disposed in portion 32 of the electroinitiator. Detonation of the explosive charge within portion 32 may be effected electrically via a conductor 34.

Further to the above, the fluid pressure source 12 also includes a pressure regulator 36 which communicates with the pressure vessel 20 downstream of diaphram 24 via a conduit 38. The pressure regulator 36 is of conventional construction and operation. Regulator 36 receives high pressure fluid from vessel 20 and reduces the pressure thereof to a lower regulated pressure for utilization in the remainder of servo system 10. Preferably, regulator 36 provides a controlled fluid pressure of about 1000 PSIG to unit 14 via a conduit 40.

The conduit 40 connects with a branched manifold 42 at unit 14. One of the branches 42a of manifold 42 connects directly with the fluid pressure motor portion of unit 14; which is generally referenced with the numeral 44 and which is described in greater detail below. However, a second branch 42b of manifold 42 communicates with a servo valve portion 46 of unit 14 at an inlet port 48. The servo valve portion 46 includes a central portion 50 of a housing 52 of the unit 14. Housing portion 50 defines an elongate stepped bore 54. The bore 54 connects inlet port 48 with an outlet port 56 and a vent port 58. A first valve member 60 is movably received in the bore 54. Valve member 60 includes a head portion 62 which is sealingly cooperable with housing 52 at a step 64 of bore 54 to close fluid communication between the inlet port 48 and outlet port 56. A coil spring 66 extends between the housing 52 and head portion 62 to resiliently bias the valve member 60 into engagement with step 64. Valve member 60 also defines a through passage 68 communicating outlet port 56 with vent port 58. A second valve member 70 is movably received in bore 54 adjacent the end of valve member 60 remote from head portion 62. Valve member 70 is sealingly cooperable with the valve member 60 at a seat 72 defined on the latter and circumscribing an opening of passage 68.

Also movably received within bore 54 is an elongate input member 74. The input member 74 is cooperable with valve member 70 to resiliently urge the latter into sealing engagement with valve member 60 at seat 72. In order to complete this preliminary description of the servo system apparatus 10 and servo valve apparatus 46, it must be noted that a portion 76 of bore 54 movably and sealingly receives a piston member 78. The piston member 78 cooperates with housing 50 to define a chamber 80. A coil spring 82 biases piston member 78 rightwardly into engagement with an end of input member 74. Thus, the coil spring 82 also biases the input member 74 rightwardly to urge valve member 70 into engagement with valve member 60. A conduit 84 communicates the chamber 80 with outlet port 56. Conduit 84 defines a restrictive orifice at 86.

The unit 14 also includes an input signal transducer portion which is generally referenced with the numeral 88. Portion 88 preferably includes a pair of solenoid coil windings 90, 92 which are disposed on opposite sides of an annular pole piece 94. The input member 74 defines an armature collar 96 which is radially aligned with pole piece 94. Consequently, the armature collar 96 and input member 74 are movable both leftwardly and rightwardly from the position illustrated in response to individual energization of solenoid coils 90, 92 respectively. A pair of electrical conductors 98, 100 extend from solenoid coils 90, 92 respectively, to connect the latter with control signal originator 18.

A fluid pressure responsive motor portion which is generally referenced with the numeral 102 is also included in unit 14. The housing 50 defines two parallel bores 106, 108 of differing and successively larger diameters, and which receive respective piston members 112, 114. The bore 106 and respective piston member 112 sealingly cooperate with each other to define a chamber 116. Manifold branch 42a communicates with chamber 116. Similarly, piston member 114 cooperates with housing 50 to define a chamber 130 within bore 108. The outlet port 56 opens to chamber 130. Piston members 112, 114 are connected to opposite ends of a lever 132 via respective rods 134, 136. The lever 132 is drivingly connected to a shaft 138 which is journaled by housing 50. Lever 132 is drivingly connected to fin 16 via a connection illustrated by dashed line referenced with numeral 140.

At this juncture, it is easily seen that opposing reciprocating motion of pistons 112, 114 will cause pivotal motion of fin 16 via rods 134, 136, lever 132, shaft 138, and connection 140. A position feedback channel for the servo system apparatus 10 is defined by a pivotal position transducer 142 operatively associated with the fin 16, and by a loop closing conductor 144 between transducer 142 and control signal originator 18. Consequently, the servo system apparatus 10 may be used to pivotally position fin 16 in response to a guidance signal supplied to control signal originator 18.

Figure 2:
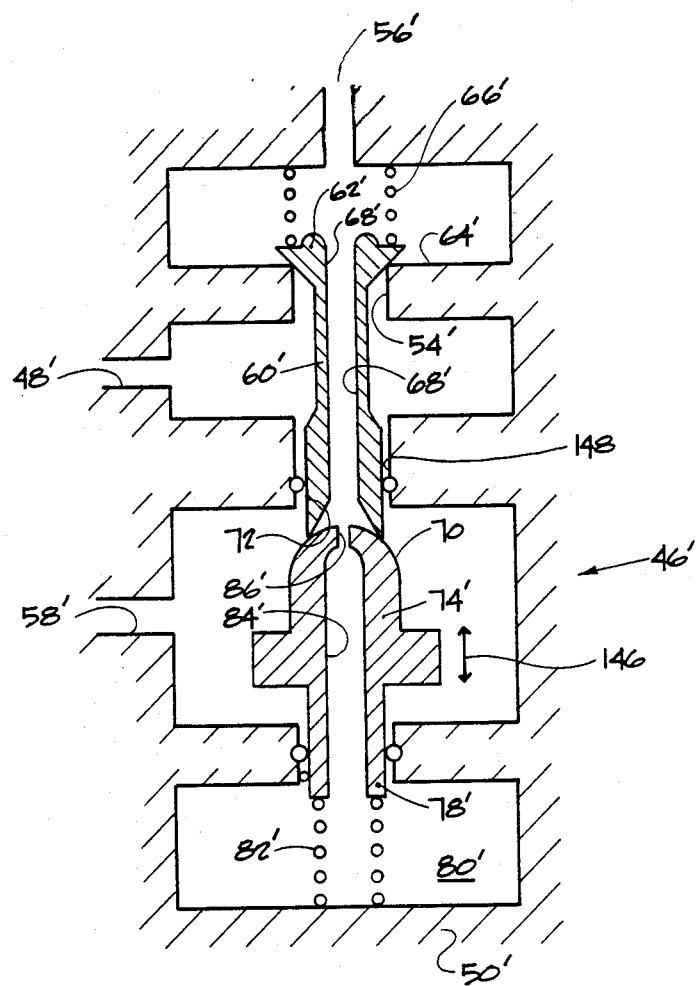
FIG. 2 is an enlarged view of the servo valve apparatus illustrated also in FIG. 1, and depicted very schematically with structural detail thereof omitted for better appreciation of the operativ,e principles of the invention.

Before considering in greater detail the operation and functional dynamics of the servo system apparatus 10, it is well to consider alone the functioning and principle of operation of the servo valve apparatus 46. In this way, the dynamics of the servo valve apparatus may be more easily understood, and the ramifications of these valve dynamics in the overall servo system 10 may be more fully appreciated. To this end, FIG. 2 depicts a schematic of the servo valve apparatus 46, wherein reference numerals previously used and with a prime added designate similar or functionally equivalent features.

Viewing FIG. 2, it will be seen that for simplicity, the second valve member 70, input member 74, piston member 78, conduit 84 and orifice 86 have been combined into a single structural element, which is referred to as input member 74' in the following discussion of FIG. 2. The input member 74' is connected to a control signal force transducer, which is not shown, and which need not be disclosed for a complete understanding of the operative principles of servo valve apparatus depicted by FIG. 2. The control signal transducer has as its characteristic the ability to apply a variable force to input member 74' in response to and analogous to the magnitude of a control input signal. The force so exerted may be either upwardly or downwardly directed, viewing FIG. 2, and is represented by arrow 146. Force 146 may effect a relatively large movement of member 74', may effect a comparatively small movement of member 74', or may effect no movement at all of member 74', dependent upon the balance of forces effective on member 74'. Finally, it must be noted that the first valve member 60' sealingly and movingly cooperates with housing 50' at a portion 148 of bore 54. The bore portion 148 is of equal diameter to the piston portion 78' of member 74', and is also equal to the seating diameter of head portion 62' at step 64', and is substantially equal to the seating diameter between first valve member 60' and input member 74'. Also, the preload of spring 66' must slightly exceed that of spring 82'.

In view of the above, it will be observed that the first valve member 60' is pressure balanced with respect to fluid pressure applied to inlet port 48'. That is, regardless of the level of fluid pressure at inlet port 48', such pressure has no effect upon the operation of servo valve apparatus 46'. Further, the first valve member 60' is also pressure balanced with respect to fluid pressure at outlet port 56'. The seating diameter of head portion 62' at step 64' substantially matches the seating diameter of input member 74' at seat 72'. Because fluid pressure at outlet 56' effective on head portion 62' is communicated by passage 68' to seat 72', the valve member 60 is substantially pressure balanced thereby. Also, the input member 74' is statically pressure balanced with respect to fluid pressure at outlet port 56'. That is, fluid pressure communicated via passage 68' to seat 72' and effective on valve portion 70 of member 74' is also communicated via orifice 86' and passage 84' to chamber 80'. Thus, fluid pressure acting downwardly on input member 74' at valve portion 70' is counter balanced by fluid pressure within chamber 80' acting upwardly on piston portion 78' viewing FIG. 2.

In further view of the above, it is easily seen that input force 146 need only overcome static friction and the preload of one of the springs 66' and 82' to overcome the static balance or equilibrium of servo valve apparatus 46'. Consequently, the servo valve apparatus 46' displays virtually no static force dead band. An input force applied either upwardly or downwardly to input member 74' will, once it exceeds the respective friction force and spring preload, open communication either from inlet 48' to outlet 56', or from outlet 56' to vent 58'. It follows, that the static gain of the servo valve apparatus 46', the ratio of fluid pressure change effected at outlet 56' in comparison to the magnitude of input force applied to member 74', will be quite high.

On the other hand, once the static equilibrium of servo valve apparatus 46' has been upset so that fluid pressure at outlet port 56' is increasing or decreasing with time, the dynamics of the valve apparatus are particularly interesting. For example, if the input force on member 74' is upwardly directed, valve member 60' is unseated at step 64' and pressurized fluid is communicated to outlet port 56'. Dependent upon the volume of fluid receiver connected with outlet port 56', and the differential pressure between the latter and inlet port 48', the fluid pressure at outlet port 56' increases as a variable function of time. Such increased fluid pressure is communicated via passage 63' to valve portion 70' of input member 74' and exerts a downwardly directed force thereon resisting the upwardly directed input force 146. The increasing fluid pressure at outlet port 56' is also communicated via passage 84' and orifice 86' to chamber 80' to exert an upwardly directed balancing force on input member 74'. However, the size of orifice 86' is selected in view of the combined volumes of passage 84' and chamber 80' so that fluid pressure change in the latter is inhibited and can not change as fast as fluid pressure at outlet port 56'. The fluid pressure in chamber 80' follows or lags behind the pressure at outlet port 56' approximately as a first time derivative of the latter. In other words, during dynamic or transient response, the servo valve apparatus 46' is not fully pressure balanced. Consequently, a portion of the input force 146 is expended in resisting dynamically unbalanced pressure forces rather than in unseating valve member 60' from step 64'. It follows, that the dynamic gain of the servo valve apparatus 46' is less than the static gain thereof, and further, that such gain is a function of the dynamic condition and recent history of pressure changes effected by the valve apparatus 46'. The chamber 80' thus serves as a short term integrating memory in the valve apparatus 46'. When the input force is downwardly directed to vent pressure from port 56' to port 58', a similar force imbalance occurs at input member 74' opposing the input force.

Figure 3:
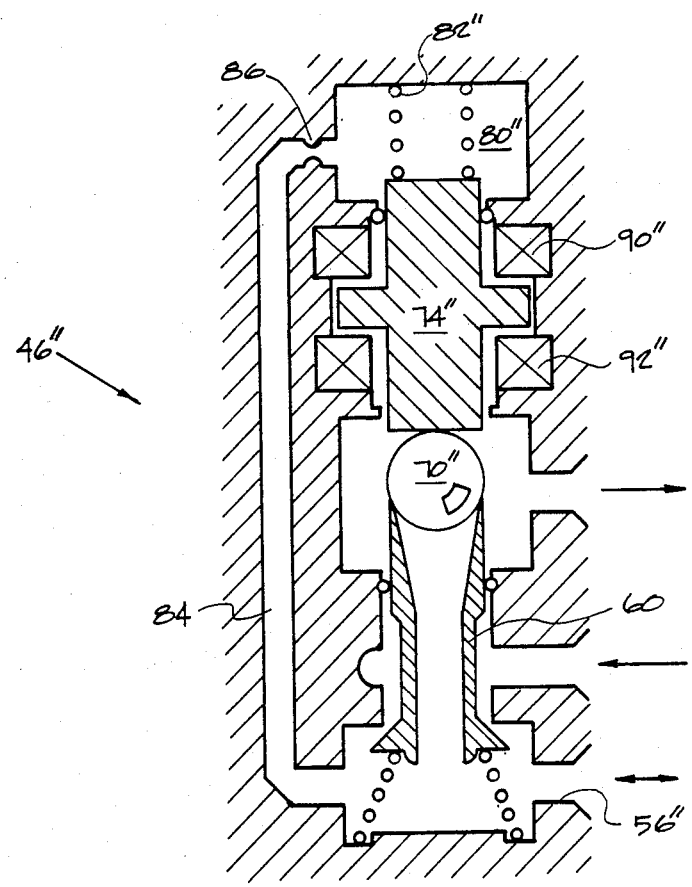
FIG. 3 is a schematic illustration of the servo valve apparatus illustrated also by FIG. 1 with essential structural detail depicted.
Figure 4:
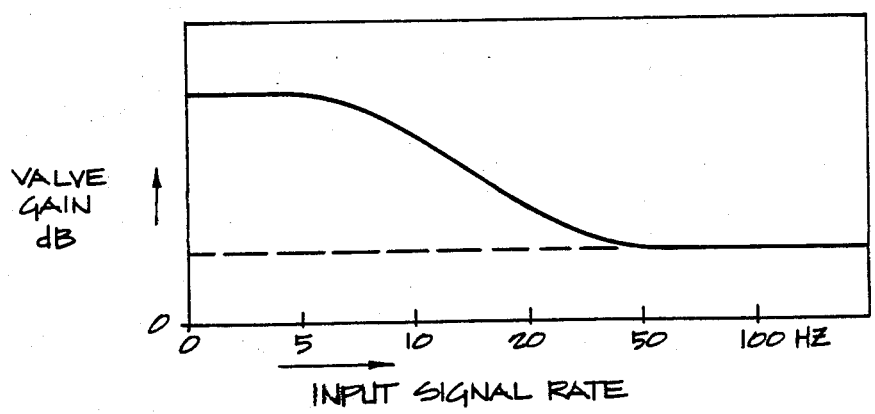
FIG. 4 is a graphical representation of a serv valve apparatus output characteristic versus a time variant input signal.

In further explanation of the above, FIGS. 3 and 4 illustrate an employment of the operative principles explained immediately above, and which are carried into effect by servo valve structure similar to that illustrated in FIG. 1. Once again, features which are similar or analogous in function to those described in connection with FIG. 1 are referenced with the same numeral used previously and having double prime added. However, an ancillary explanation is required at this juncture for a complete understanding of the following. The operative principles of the servo valve of FIG. 2 were described in the context of an analog servo system. That is, an input force was applied to member 74' and the movement thereof and pressure change response at outlet port 56' were analogous to (a function of) the input force. However, modern servo technology increasingly favors binary digital operation. The reasons for this favoritism are beyond the scope of this writing.

Moreover, a particularly favored form of binary servo operation is Pulse Duration Modulation (PDM). In such a servo system, input signals are generated as a train of substantially square wave electrical voltage pulses having a constant clock rate and amplitude, and an individually variable duration or duty cycle. The duration of each one of such pulses may vary from zero to the full duration allowed by the particular clock rate of the servo system. Consequently, a train of zero duration pulses represents one extreme of the possible input signals while a train of full duration pulses represents the other extreme.

Viewing FIG. 3, it is believed that when a PDM input signal is applied to one or the other of solenoid coils 90'', 92'', several phenomena including electrical, magnetic, and inertial cooperate to effect a virtually complete filtering of the PDM signal and an analog output response at outlet port 56''. For example, when a PDM signal is applied to solenoid coil 92'', with the servo valve apparatus 46'' in a condition of static equilibrium, the PDM square wave voltage signals are believed to be partially filtered by the capacitance and inductance of coil 92''. Consequently, current within coil 92'' will be time variant, but will not display the sharp square wave shape of the PDM voltage signal. Current within coil 92'' generates a magnetic field within pole piece 94'' and armature 96''. A similar partial filtering is believed to be effected by magnetic inertia phenomena so that the magnetic force exerted on input member 74'' is further smoothed. Similarly, although the input member 74'' is quickly movable, the mass inertia of input member 74'' is believed to effect another partial filtering so that the input member 74'' may dither, but exerts a time average force which is analogous to the filtered PDM input signal. A further possible filtering may be effected by the fluid volume communicating with outlet port 56'' so that fluid pressure thereat is analogous to the filtered PDM input signal despite possible dithering of the valve members 60'', 70'' in response to dither of input member 74''.

Consideration of the above while recalling the description of FIG. 2 will make apparent that PDM operation of the servo valve apparatus 46'' does not defeat the variable gain function thereof, which function was explained above. Moreover, FIG. 4 illustrates the result of mathematical modeling of all the physical functions and phenomena discussed above. FIG. 4 illustrates that the gain of servo valve apparatus 46'', the ratio of output pressure change effected in comparison to the magnitude of input signal applied, is a function of the rate at which the input signal is changed. The variable gain feature of the servo valve apparatus 46'' has been verified by actual reduction of the present invention to practice in a servo system, which also reflected the variable gain of the servo valve apparatus. FIG. 4 depicts a valve gain roll off or diminution for the embodiment tested of about 15 db between near-static operation and an input frequency of about 60 HZ. Above the 60 HZ frequency the servo valve apparatus displayed a nearly constant gain within the frequency range of the test.

Having observed the structure and functioning of the servo valve apparatus alone by consideration of FIGS. 2-4, the advantages of such valve apparatus in a complete servo system, as depicted by FIG. 1, may be appreciated. Returning once again to consideration of FIG. 1, when the servo system 10 is to brought into operation, the explosive charge within portion 32 of electroinitiator 26 is detonated by electrical current applied to conductor 34. Thus, plunger 28 is driven upwardly to puncture diaphram 24 with penetrator 30. Consequently, high pressure gaseous Helium flows via conduit 38 to pressure regulator 36 and is regulated thereby to a controlled pressure of about 1000 PSIG. Such regulated pressure fluid flows via conduit 40 to manifold 42, and to chamber 116. The piston 112 has a larger effective area which applies a clockwise torque to shaft 138 via rod 134. Such clockwise torque will cause corresponding pivotal movement of fin 16 which is sensed via transducer 142 and communicated to signal originator 18 via conductor 144. Assuming that such clockwise movement of fin 16 is not in accord with the guidance command received by initiator 18, the latter will apply a PDM control signal to solenoid coil 92 via conductor 100 to move input member 74, and valve members 60 and 70 rightwardly. Consequently, head portion 62 of valve member 60 is unseated to admit pressure fluid to chamber 130. The piston 114 has a larger effective area than piston 112 so that a lower fluid pressure in chamber 130 is sufficient to counterbalance the full regulated fluid pressure in chamber 116. Upon the chamber 130 attaining the necessary counterbalancing pressure, and attainment of the commanded fin position as sensed by signal originator 18 via transducer 142, the PDM input signal to solenoid coil 92 is stopped and the servo system attains a state of static equilibrium.

Subsequent to the above, by way of example, a guidance command may be received by signal originator 18 calling for a clockwise pivotal movement of fin 16. Thus, signal originator 18 supplies a PDM input signal to solenoid coil 90 via conductor 98 to shift input member 74 leftwardly, viewing FIG. 1. Such leftward shift of input member 74 causes valve member 70 to be unseated from valve member 60 at seat 72 and venting of chamber 130 to ambient via passage 68 and vent port 58. Consequently, a force (torque) imbalance is effected upon shaft 138 via pistons 112, 114 to pivot fin 16 clockwise. The clockwise angular acceleration of fin 16 is a function of physical factors including the effective torque imbalance, inertia of the moved parts, external loading, and friction. Pivotal velocity attained by fin 16 is a time integral of angular acceleration.

Further, it must be recalled that pivotal acceleration of the fin member 16 is approximately proportionate to the fluid pressure imbalance on the pistons 112, 114, and is, therefore, also approximately proportionate to the difference between the balancing pressure which existed in chamber 130 before receipt of the input signal and the lessened pressure in chamber 130 resulting from the partial venting of fluid pressure therefrom. In other words, the pivotal acceleration effected at fin 16 in response to an input signal is a function of the recent pressure change history of the servo system. Recalling the principles of operation of servo valve apparatus 46, it will be remembered that the pressure imbalance effective on input member 74 and resisting the input signal is also a function of the recent pressure change history of the servo valve apparatus. It follows, that the dynamic pressure imbalance effective within servo valve apparatus 46 is analogous to a negative second order (acceleration) feedback within the servo system 10.

In overview once again, the servo system 10 includes a direct feedback of fin position via transducer 142 and conductor 144. Further, servo valve apparatus 46 provides an added feedback which is analogous to a second order time derivative of fin position (fin angular acceleration). Those skilled in the art to which the present invention pertains will recognize that increasing the number of feedback channels within such a servo system offers many advantages including improving the stability, frequency response and transient response of the servo system.

Figure 5:
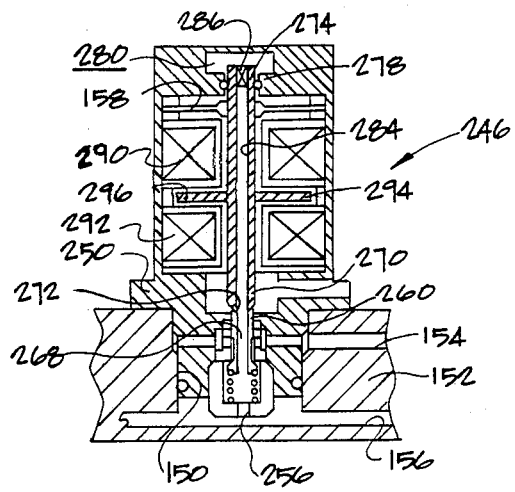
FIG. 5 depicts a cross sectional elevation view of a servo valve apparatus according to the invention.
Figure 6:
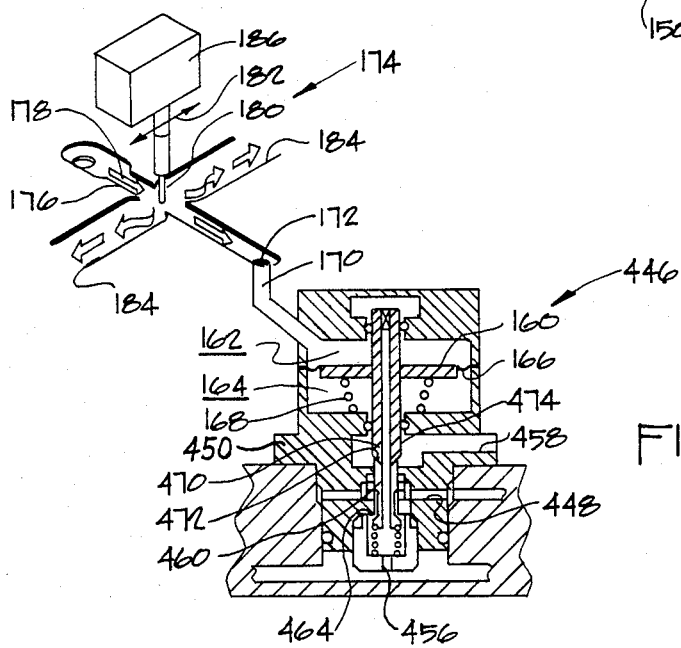
FIG. 6 depicts a cross sectional elevation view of another embodiment of a servo valve apparatus according to the invention.
Figure 7:
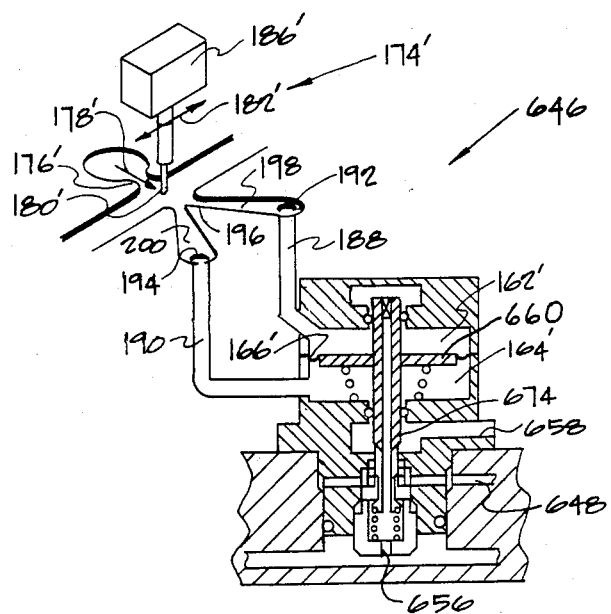
FIG. 7 depicts a cross sectional elevation view of yet another embodiment of a servo valve apparatus according to the invention.

FIGS. 5, 6 and 7 depict alternative embodiments of the servo valve apparatus of the invention wherein features which are similar in structure or analogous in function to those described above are referenced with the same numeral used above, and increased by 200, 400, and 600, respectively.

FIG. 5 illustrates a servo valve apparatus 246, having a housing 250. A portion of the housing 250 is received within a bore 150 of a base member 152, and sealingly cooperates therewith to bound fluid flow paths 154, 156 communicating with valve apparatus 246. Comparison of the structure of valve 246 with that depicted schematically by FIG. 2 will reveal many similarities. For example, valve apparatus 246 includes a movable input member 274 defining a valve portion 270 at the lower end thereof. The valve portion 270 cooperates with a seat 272 defined on the upper end of a valve member 260 and circumscribing a through passage 268. Similarly to the input member 74' of FIG. 2, the input member 274 defines a through passage 284 having a flow restricting orifice 286 defined therein. The input member 274 also defines a piston portion 278 which sealingly cooperates with the housing 250 to bound a feedback chamber 280. The passage 284 opens from outlet port 256 to chamber 280.

In contrast to the servo valve apparatus of FIG. 2, the apparatus 246 of FIG. 5 includes a pair of solenoid coils 290, 292 disposed on opposite sides of a pole piece 294. The pole piece 294 radially aligns with an annular armature collar 296 carried by the input member 274. The above will be recognized as similar to the servo valve apparatus of FIGS. 1 and 3. However, in further contrast, the valve apparatus 246 includes an annular resilient member 158 which at its inner diameter engages input member 274 and at its outer diameter engages the housing 250. The member 158 is functionally similar to spring 66 of FIGS. 1–3. However, member 158 by its annular configuration also performs a guiding function for the input member 274. that is, as the input member 274 moves upwardly or downwardly from the illustrated position, the member 158 resiliently deflects to perform its springing function, and also assists in holding the input member 274 centered within the housing 250 without imposing any sliding friction on the input member. This feature of the valve apparatus 246 is of significance because by reducing friction within the servo valve, the hysterisis of the valve and of the servo system are both reduced. In view of the explanation above of the analog operation of the valve of FIG. 2 and of PDM operation of the valve of FIGS. 1 and 3, no further explanation of the operation of valve apparatus 247 is deemed necessary.

FIGS. 6 and 7 depict alternative embodiments of the invention which are very similar in structure, but which differ from each other in the way in which the input member of the valve is moved in response to input signals. The embodiments of both FIGS. 6 and 7 differ from those embodiments of FIGS. 1 and 3 described above in that the previous embodiments incorporated an electrical-to-force transducer for moving the valve input member. In contrast, the embodiments of FIGS. 6 and 7 incorporate a portion of a structure which pneumatically effects a force amplification between a very low-power electrical-to-force transducer and the input member of the servo valve.

In further explanation of the above, consideration of FIG. 6 will reveal that the servo valve apparatus 446 there depicted is in many ways similar to that of FIG. 5. However, the input member 474 includes a radially extending partition member 160 separating chambers 162, 164 defined within housing 450. The partition member 160 sealingly cooperates with housing 450 via a diaphram 166 therebetween. A coil spring 168 disposed within chamber 164 resiliently biases input member 474 upwardly to a position wherein outlet port 456 is communicated to vent port 458.

In order to effect controlled movement of the input member 474, a conduit 170 connects chamber 162 with an outlet port 172 of a fluidic amplifier 174. The amplifier 174 includes a power nozzle 176 directing a fluid power jet (arrow 178) toward outlet port 172. Interposed between nozzle 176 and port 172 is a transversely movable jet deflection pin 180. The pin 180 is movable transversely to jet 178 as illustrated by double ended arrow 182. Transverse movement of pin 180 selectively deflects all or a portion of power jet 178 into vent passages 184. The pin 180 is selectively movable transversely by a low-power electrical-to-force transducer 186, which preferably takes the form of a galvanometer movement.

In view of the above, it will easily be seen that a particular selected position of pin 180 will result in a determined pressure at outlet port 172 (and in chamber 162) which pressure is sufficient to counterbalance spring 168 to hold input member 474 in a closed-center position. In such a closed-center position, the valve portion 470 of input member 474 engages seat 472 and valve member 460 engages step 464. Thus communication from inlet port 448 to outlet port 456, and from outlet port 456 to vent port 458, is closed. Movement of pin 180 effecting a sufficient increase of pressure in chamber 162 above the determined pressure moves input member 474 and valve member 460 to open fluid flow from inlet port 448 to outlet port 456. Similarly, movement of pin 180 effecting a sufficient decrease of pressure in chamber 162 below the determined pressure allows spring 168 to move input member 474 to open outlet port 456 to vent port 458. Thus, the embodiment of FIG. 6 employs push-only analog operation, and is similar in operation to that described above with reference to FIG. 2.

FIG. 7 depicts a servo valve apparatus 646 very similar to apparatus 446 of FIG. 6. In order to obtain reference numerals for use in describing the structure depicted by FIG. 7, features analogous to those described for the first time immediately above with reference to FIG. 6 are referenced with the same numeral having a prime added. However, the input member 674 of the apparatus 646 is not spring loaded in either direction, but rather, is adapted for push-pull analog operation. Such push-pull analog operation is effected by passages 188, 190 which respectively connect opposite chambers 162' and 164' to respective outlet ports 192, 194 of a fluidic amplifier 174'. The amplifier 174' includes a nozzle 176' directing a power jet 178' toward a splitter 196. The splitter 196 separates respective receiver cavities 198, 200 communicating with outlet ports 192, 194. Similarly to the amplifier 174, the amplifier 174' is associated with a gavanometer analog electrical-to-force transducer 186'. The transducer 186' moves a pin 180' transversely (arrow 182') to power jet 178' to deflect the latter. Dependent upon the position of pin 180', the jet 178' may be deflected so as to be received entirely into receiver 198, or entirely into receiver 200, or may be split substantially equally therebetween.

Consequent to the above, when the pin 180' occupies a particular selected position, the jet 178' is split to maintain respective fluid pressures within chambers 162', 164' to hold input member 674 in a closed-center position. Transverse movement of pin 180' effecting an increase in pressure within chamber 162' will also effect a decrease of pressure within chamber 164', and a downward movement of input member 674 and valve member 660 to open inlet port 648 to outlet port 656. Conversely, opposite transverse movement of pin 180' will effect an increase of pressure in chamber 164' and a decrease of pressure in chamber 162'. Thus, input member 674 is moved upwardly to vent outlet port 656 to port 658.

Figure 8:
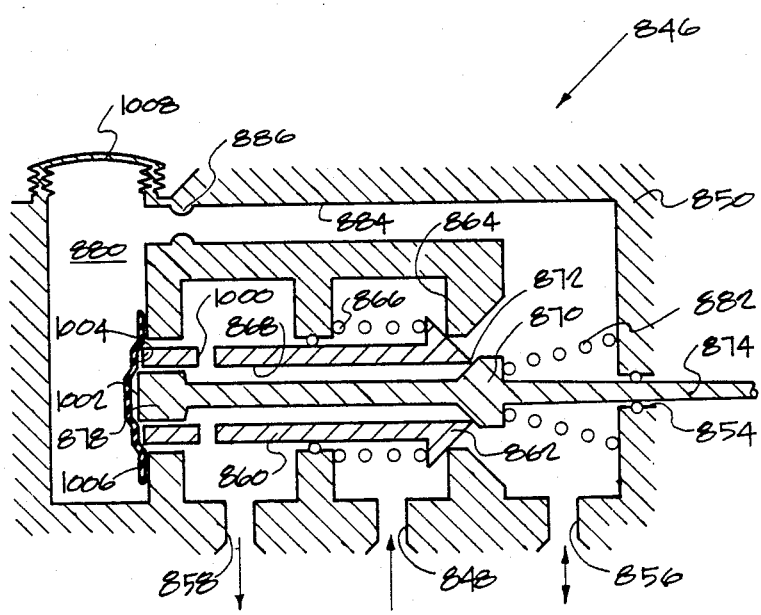
FIG. 8 depicts a cross sectional schematic view of yet another alternative embodiment of the invention which is particularly adapted for use with incompressible fluid.

FIG. 8 schematically depicts an embodiment of a servo valve apparatus according to the present invention, which valve is adapted for operation with incompressible fluid. As above, features of the embodiment depicted in FIG. 8 which are analogous to those described in connection with FIGS. 1 or 3, are referenced with the same numeral used above and increased by 800. The servo valve apparatus 846 depicted by FIG. 8 includes a housing 850 which movably receives a pair of coaxial valve members 860, 870. The valve member 860 includes a valving portion 862 which sealingly engages the housing 850 at a step 864 thereon to close communication between an inlet port 848 and an outlet port 856. A coil spring 866 urges valve member 860 toward sealing engagement with the step 864. The other valve member 870 is elongate and is sealingly cooperable with the valve member 860 at a seat 872 thereon. The valve member 870 includes an input portion 874 sealingly extending externally of housing 850 through a portion of a stepped bore 854 defined thereby. A coil spring 882 urges valve member 870 toward sealing engagement with seat 872 so as to close communication between outlet port 856 and vent port 858. It will be noted that valve member 860 defines a cross passage 1000 providing fluid communication between passage 868 and vent port 858. Further, the valve member 870 includes an enlarged diameter piston portion 878 which is substantially coplanar at its left end 1002 with the corresponding end 1004 of valve member 860, viewing FIG. 8. The referenced ends 1002, 1004 of both valve members 860, 870 communicate with a chamber 880 via a flexible sealing diaphram 1006 which overlies the ends of both valve members. Chamber 880 communicates with outlet port 856 via a passage 884 having a restrictive orifice 886 therein.

Apart from the structural differences between valve apparatus 846 and those valve structures described above, which will be apparent in view of FIG. 8 and the foregoing, the valve apparatus 846 includes a resilient bellows member 1008. The bellows member 1008 communicates at one side with chamber 880 and at its other side communicates with ambient pressure. Thus, it will be seen that chamber 880 is of resilient variable volume as bellows member 1008 expands and contracts in response to fluid pressure therein. That is, chamber 880 is fluid volume absorptive because of bellows member 1008.

During operation of valve apparatus 846, incompressible pressure fluid is communicated from inlet port 848 to outlet port 856 and from outlet port 856 to vent port 858 in response to respective leftward and rightward input movements of portion 874 effected by input force applied thereto. Thus, pressure fluid flow to and from chamber 880 via passage 884 and orifice 886. Because such fluid flow is incompressible, only a very small flow would be sufficient to match the pressure in chamber 880 to the pressure at outlet port 856 were it not for bellows member 1008. In view of the resiliency of bellows member 1008 and the volume variation possible for chamber 880 as the former expands and contracts with fluid pressure changes therein, such pressure changes are delayed to follow pressure changes at outlet port 856 substantially as a first time derivative thereof. Consequently, the valve members 860, 870 are each subject to a respective rightwardly directed feedback pressure force which is transmitted thereto via diaphram 1006.

Figure 9:
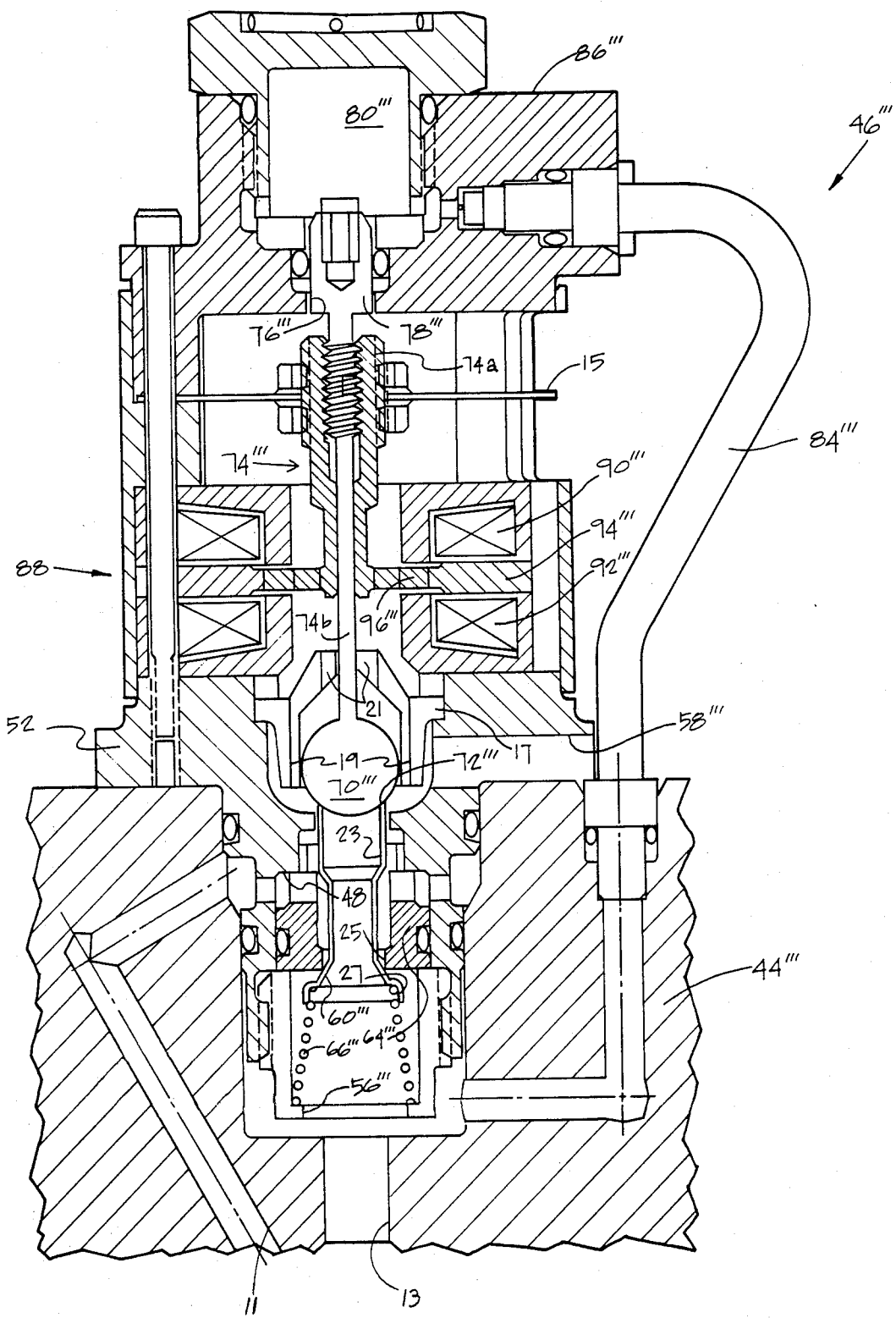
FIG. 9 depicts a cross sectional view of an embodiment of the invention which is similar in operation to that depicted schematically by FIGS. 1 and 3.

FIG. 9 depicts a cross sectional view of an alternative embodiment of the inventive servo valve apparatus which, as reduced to practice, is of PDM solenoid operated type like that depicted schematically by FIGS. 1 and 3. However, FIG. 9 also depicts several salient features which are of great importance when an actual implementation of the present servo valve apparatus is attempted. In order to preserve space upon FIG. 9 and because of similarities, the series of reference numerals of FIGS. 1 and 3 and having a triple prime added is used for analogous features of FIG. 9, which by now should be familiar to the reader.

FIG. 9 depicts a servo valve 46''' which is secured to a motor housing 44''' (only a portion of which is illustrated). The servo valve apparatus 46''' includes a housing 52''' movably receiving valve members 60''', 70''', and an input member 74'''.

A coil spring 66''' coacts with the valve member 60''' to urge the latter into sealing engagement with an annular valve seat 64''' to close fluid communication between an inlet port 48''' and an outlet port 56'''. The housing 44''' defines respective passages 11 and 13 communicating individually with ports 48''' and 56'''. Similarly to the embodiment depicted by FIG. 5, valve 46''' includes an annular resilient spring member 15. The spring member 15 is threadably coupled with an elongate portion 74a of input member 74''', which portion also defines armataure collar 96'''. Accordingly, the armature collar 96''' may be axially adjusted relative spring member 15 to be radially aligned with pole piece 94 while the spring member 15 is sufficiently deflected to exert a desired predetermined closing preload on valve member 70''' via the input member 74'''.

Further, in order to compensate for tolerance stack up within individual serially manufactured valves, the input member 74''' comprises an elongate central portion 74b which at its lower end extends into contacting relationship with the valve member 70''' and which at its upper end defines feedback piston portion 78'''. The portion 74b is threadably coupled with portion 74a so that a sealing relationship of valve member 60''' with seat 64''' may be achieved simultaneously with valve member 70''' sealingly engaging seat 72'''.

An additional important feature of valve 46''' is an axially extending spider member 17 which is disposed in surrounding relationship with both the valve member 70''' and with a lower end portion of member 74b. The spider member 17 is immovably captured within the housing 52 and defines a multitude of spaced apart axially extending legs 19 (only two of which are visible on FIG. 9) movably receiving the valve member 70''' for axial relative movement. Spider member 17 also defines a plurality of spaced apart radially extending fingers 21 (only two of which are visible) movably and guidingly receiving the portion 74b of input member 74'''. The spider member 17 contributes to coaxial alignment of valve members 60''', and 70''', as well as of input member 74'''. Further, it will be appreciated that input member 74''' is rapidly movable and is particularly adapted for PDM operation because frictional engagement therewith occurs only at the piston portion 78''', and to a lesser extent at spider member 17.

Further, it will be appreciated that the valve member 60''' defines a certain sealing diameter with the valve seat 64'''. The valve member 60''' also defines a determined sealing diameter with the valve member 70''', which is substantially the same as the certain diameter defined with valve seat 64'''. In order to achieve static pressure balancing of the valve apparatus 46''', the input member portion 78''' also defines a feedback diameter exposed to chamber 80''' which is substantially equal to both the certain and determined diameters at valve member 60'''. In order for valve member 60''' to define equal sealing diameters with valve member 70''' and with seal member 64''', the valve member 60''' defines a seat-defining portion 23 opposite the head end 62''' which is radially enlarged relative to the remainder of the valve member. Portion 23 defines seat 72'''. Inspection of FIG. 9 will reveal that both the head end portion 62''' and seat-defining portion 23 of valve member 60''' are larger in outer diameter than a seat-defining bore portion 25 of seat member 64'''. As a result, the valve member 60''' and seat member 64''' are captively retained permanently together while allowing for relative valving movement therebetween. Further, it will be noted that valve member 60''' defines a radially and axially extending skirt portion 27 which is L-shaped in cross section. The skirt portion 27 defines an annular spring receiving seat on valve member 60''' for coil spring 66'''.

Figure 10A:
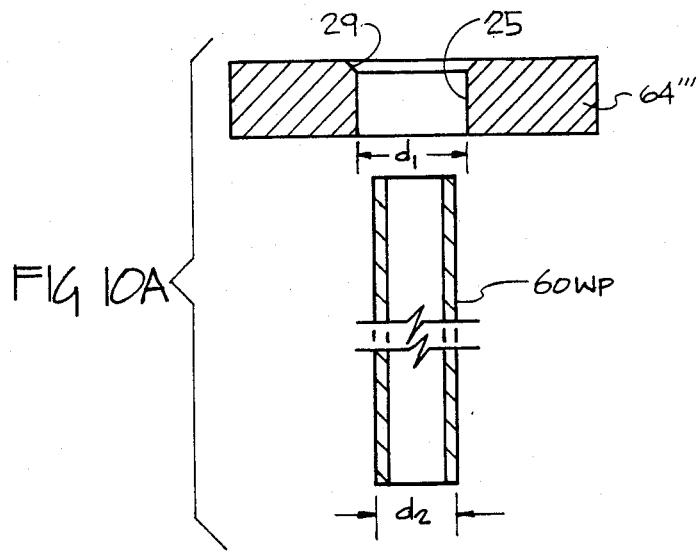
FIGS. 10A, 10B and 10C schematically depict steps in the method of making a servo valve apparatus according to the invention.
Figure 10B:
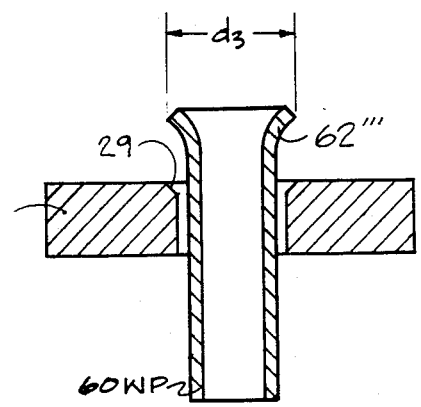
Figure 10C:
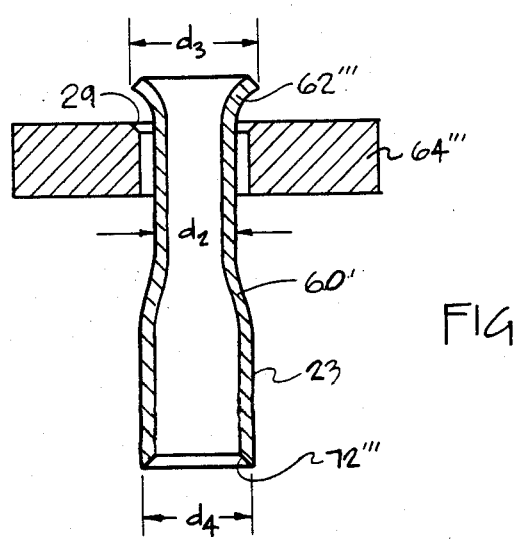

Turning now to FIGS. 10A, 10B, and 10C, steps in the method of making the servo valve 46''', and specifically the seat member 64''' and valve member 60''' thereof are illustrated. Considering first FIG. 10A, an annular seat member 64''' is depicted having a circular aperture 25 opening therethrough. The aperture 25 has an inner diameter $d_1$ of determined size and opens on the upper face of seat member 64''' to define a seat 29 substantially of diameter $d_1$. A valve member work piece 60WP is provided in preparation for making the valve member 60'''. Work piece 60WP is of shape retaining but plastically deformable tubular material having an outer diameter $d_2$ which is less than $d_1$.

FIG. 10B illustrates a step subsequent to the step of FIG. 10A, wherein the valve member work piece 60WP is plastically deformed or swaged radially outwardly at one end thereof to define a head end portion 62''' thereof having outwardly deverging tubular walls. The head end portion 62''' of 60WP is sealingly engageable with the seat 29 of seat member 64''' to define a sealing diameter substantially equal to $d_1$. It will be noted that head end portion 62''' defines an outer diameter $d_3$ which is greater than $d_1$ of the seat member 64'''. However, the seat member 64''' is receivable upon the valve member work piece 60WP because the end of the latter opposite end 62''' is yet of diameter $d_2$.

FIG. 10C illustrates that after the seat member 64''' is received on valve member work piece 60WP, a portion of the latter is deformed or swaged to be expanded at the end thereof opposite the head end portion 62''' to define a seat end portion 23 defining an outer diameter $d_4$ which is greater than $d_1$. The seat member 64''' is thus trapped and captively but movably retained on the valve member 60''' between the end portions 62''', 23 thereof, both of which have an outer diameter larger than $d_1$. Seat end portion 23 defines a seat thereon at 72''' which is sealingly engageable with a second valve member 70''' (recalling FIG. 9) to define a sealing diameter substantially equal to $d_1$, and equal to the sealing diameter defined between valve member 60''' and seat member 64''', within the limits of physical practicability.

Accordingly, it will be appreciated that the servo valve having parts thereof made according to FIG. 10 is perfectly or almost perfectly pressure balanced in its closed center static condition. Only the preloads of one of the centering springs acting on the input member need be overcome in order to operate the valve. Those skilled in the pertinent art will recognize that the method of FIG. 10 is not limited to use with a work piece 60WP of tubular material. That is, the work piece can be machined from thick walled tube or from bar stock, for example, to replicate the member 60WP of FIG. 10B. Such a work piece may subsequently be deformed or swaged to the configuration of FIG. 10C. Further, the seat end portion 23 of work piece 60WP may be first formed and the valve member 64''' united with the work piece 60WP, after which the head end portion 62''' is defined thereon. Additionally, the skirt portion 27 at head end portion 62''' of valve member 60''' may be formed simultaneously with or subsequent to the formation of head end portion 62''', viewing FIG. 9 once again.

While the present invention has been depicted and described with reference to selected preferred embodiments thereof, no limitation upon the invention is implied by such reference, and none is to be inferred. The invention is intended to be limited only by the spirit and scope of the appended claims which also provide a definition of the invention.

We claim:

1. The method of making a pressure balanced servo valve apparatus of closed-center type comprising the steps of:
   (a) forming a poppet member work piece having a body portion of outer diameter $d_2$ and one of a head portion end or seat portion end having a respective outer diameter ($d_3$ or $d_4$) exceeding $d_2$;
   (b) forming a seat member having an aperture therethrough of inner diameter $d_1$ larger than diameter $d_2$ and less than diameter ($d_3$ or $d_4$) and defining a seat circumscribing said aperture and substantially of sealing diameter $d_1$;
   (c) uniting the products of steps (a) and (b) by inserting said poppet member work piece body portion through said aperture;
   (d) expanding said poppet member work piece body portion at the end thereof opposite said one end to define the other of said head portion end or seat portion end having a respective outer diameter ($d_3$ or $d_4$) also exceeding $d_2$; and
   (e) utilizing steps a-d to permanently retain said poppet member and said seat member in relatively movable cooperable union whereby said seat member and said poppet member are sealingly and movably cooperable at said head portion and said seat to selectively control fluid flow therebetween.

2. The method of claim 1 further including the step of forming a seat on said poppet member at said seat portion end thereof and substantially of sealing diameter $d_1$.

3. The method of claim 1 wherein step (a) includes the steps of providing a length of tubular material having an outer diameter $d_2$, and expanding one end of said tubular material to define one of said head portion end or seat portion end and having a respective outer diameter $d_2$ exceeding $d_1$.

4. The method of claim 1 further including the step of forming a radially and axially extending skirt portion at said head portion end for receiving cooperation with a resilient member.

5. In a valve apparatus of the closed-centered type having a poppet member sealingly cooperable with a housing seat portion and movable within said housing seat portion to open and close communication between a first port and a second port, said poppet member defining a passage communicating one of said first port or second port with a third port and sealingly cooperating with another valve member in a certain relative position therebetween to close said passage, the method of making said poppet member to define equal effective sealing areas with said housing and with said another valve member thereby to achieve pressure balancing thereof, said method including the steps of:
   (a) configuring said poppet member to define a central body portion having a determined outer diameter;
   (b) uniting said seat portion and said poppet member by movably disposing said central body portion within said seat portion;
   (c) relatively configuring said poppet member and said seat portion to define a certain sealing diameter which is substantially equal to or larger than said determined diameter;
   (d) relatively configuring said another valve member and said poppet member to define a sealing diameter equal to said certain diameter; and
   (e) utilizing steps (c) and (d) in conjunction to captively retain said seat portion and said poppet member in relatively movable permanent union.

6. The method of making a valve apparatus comprising the steps of:
   (a) providing a seat member having an aperture therethrough of determined diameter and opening on a surface thereof to define a valving seat substantially of said determined diameter;
   (b) providing an elongate valve member defining a passage therethrough and having a central portion defining an outer diameter less than said determined diameter;
   (c) disposing said seat member on said valve member in congruence with the central portion thereof;
   (d) forming a head end portion on said valve member defining an outer diameter larger than said determined diameter and sealingly engageable with said seat member at said valving seat to define a sealing diameter;
   (e) forming a seat end portion on said valve member opposite said head end portion and defining an outer diameter larger than said determined diameter;
   (f) utilizing steps (d) and (e) in conjunction to movably trap said seat member on said valve member central portion between said head end portion and said seat end portion thereof.

7. The method of claim 6 further including the step of providing an elongate tubular valve member work piece of substantially uniform outer diameter, and deforming said work piece to define one of said head end portion or seat end portion of said valve member.

8. The method of claim 7 further including the step of deforming said work piece to define the other of said head end portion or seat end portion.

9. The method of claim 6 further including forming a seat on said valve member at the seat end portion thereof which is sealingly cooperable with another valve member to define another sealing diameter equal to said sealing diameter.

10. The method of claim 6 further including the step of forming said head end portion to define a radially and axially extending skirt of substantially L-shaped cross section defining an annular spring seat thereat.

11. The method of making a valve assembly comprising:

providing a seat member defining a valving seat and an opening therethrough;

providing a valve member having a pair of opposite end portions;

inserting said valve member through said opening so that said pair of opposite end portions extend outwardly of said opening; and enlarging one of said pair of opposite end portions after insertion of said valve member through said seat member opening to preclude passage of said one end portion through said opening while allowing relative movement of said valve member and said seat member;

further including the step of enlarging the other of said pair of opposite end portions to preclude passage thereof through said opening.

12. The method of claim 1 wherein enlarging said end portion of said valve member includes plastically deforming said end portion to enlarge it relative to its undeformed size.

13. The method of claim 1 further including the step of defining an annular spring seat at one end of said valve member.

14. The method of claim 13 wherein defining said spring seat includes the step of forming a radially and axially extending skirt at said one end of said valve member.

* * * * *